No. 691,606. Patented Jan. 21, 1902.
J. J. CURRAN.
DRY KILN.
(Application filed Nov. 27, 1901.)
(No Model.) 3 Sheets—Sheet 1.
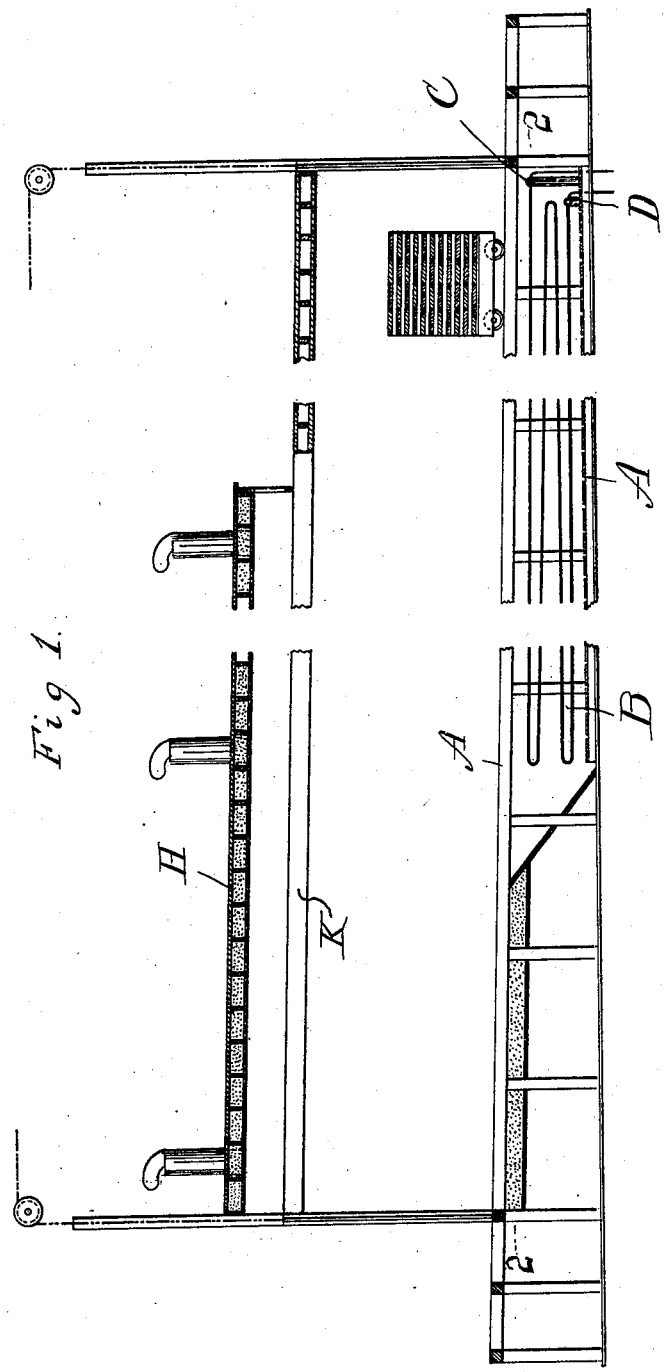

No. 691,606. Patented Jan. 21, 1902.
J. J. CURRAN.
DRY KILN.
(Application filed Nov. 27, 1901.)
(No Model.) 3 Sheets—Sheet 2.
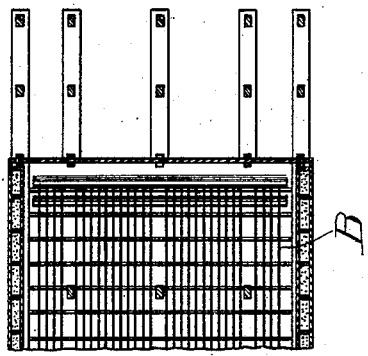
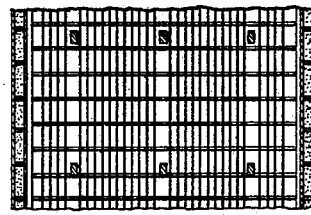
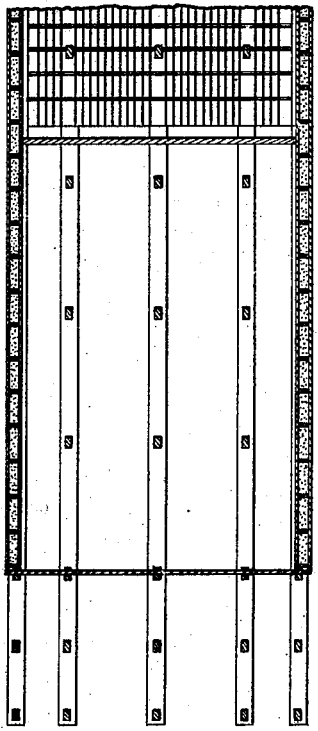
Witnesses.
Otto E. Johnson.
Mary R. Tanner.
Inventor
John J. Curran
By Franklin H. Hough
Attorney No. 691,606. Patented Jan. 21, 1902.
J. J. CURRAN.
DRY KILN.
(Application filed Nov. 27, 1901.)
(No Model.) 3 Sheets—Sheet 3.
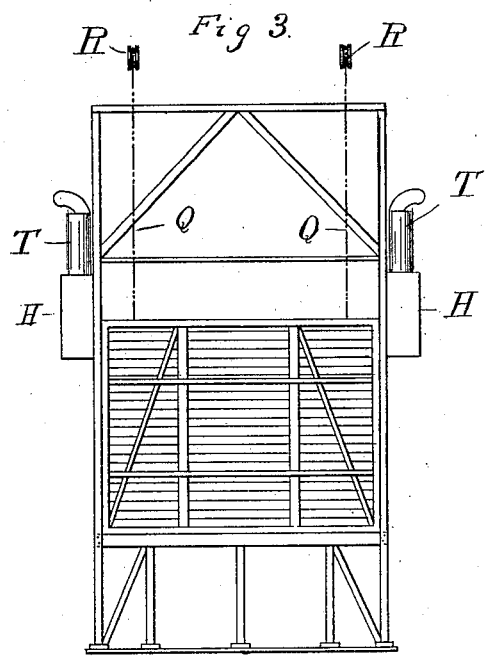
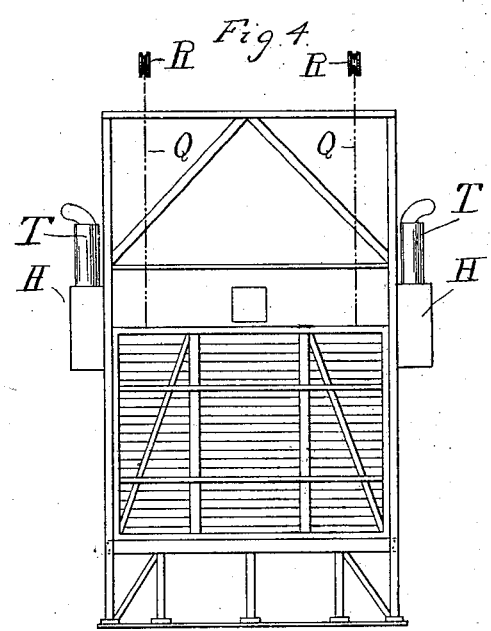
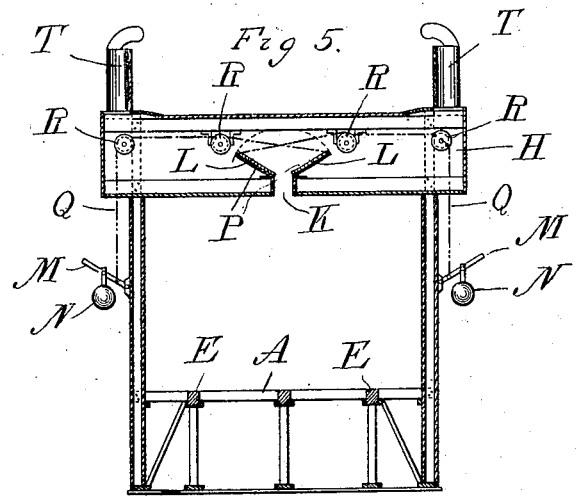
Witnesses.
Otto E. Johnson.
Mary R. Tanner.
Inventor
John J. Curran
By Franklin S. Hough
Attorney.

UNITED STATES PATENT OFFICE.

JOHN J. CURRAN, OF CHICAGO, ILLINOIS.

DRY-KILN.

SPECIFICATION forming part of Letters Patent No. 691,606, dated January 21, 1902.

Application filed November 27, 1901. Serial No. 83,907. (No model.)

*To all whom it may concern:*

Be it known that I, JOHN J. CURRAN, a citizen of the United States, residing at Chicago, in the county of Cook and State of Illinois, have invented certain new and useful Improvements in Dry-Kilns; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in dry-kilns; and it consists in the provision of an exhaust-compartment located above and having a communicating passage-way with a drying-chamber, through which passage-way the moisture issuing from the materials being dried is drawn by a natural draft into the exhaust-compartment and allowed to escape to the atmosphere through automatically-operated ventilators, thus enabling the kiln to turn out dried material more expeditiously than with systems commonly in use.

Other features of the invention comprise automatically-operated doors, which are counterbalanced and hinged adjacent to the passage-way leading from the drying-chamber to the exhaust-compartment and covered with an absorbent substance whereby moisture from the drying-chamber will be absorbed by said covering, resulting in the lading of the doors with an extra weight, which will cause same to open by gravity, thus affording communication through the passage-way from the drying-chamber to the exhaust-compartment above. As the quantity of moisture within the drying-chamber diminishes the heat will absorb the moisture in the coverings of the doors, and the latter will return to their normal closed positions, thus shutting off communication between the drying-chamber and the exhaust-compartment.

The invention consists, further, in various combinations and arrangement of parts, which will be hereinafter more fully described and then specifically defined in the appended claims and illustrated in the accompanying drawings, which, with the letters of reference marked thereon, form a part of this application, and in which drawings—

Figure 1 is a longitudinal sectional view centrally through a kiln embodying my invention. Fig. 2 is a horizontal section through the kiln, showing the arrangement of the heating-coils, said section being taken on line 2 2 of Fig. 1. Fig. 3 is an elevation of one end of the kiln. Fig. 4 is an elevation of the opposite end of the kiln. Fig. 5 is a cross-sectional view through the kiln, exhaust-compartment, and automatically-operated doors.

Reference now being had to the details of the drawings by letter, A designates the perforated floor of the kiln, made up of boards, with spaces intervening, through which the air enters the space above the floor containing the steam-coils B. These steam-pipes are arranged in the form of vertical transverse groups, connected with suitable transversely-arranged supply-head C and discharge-head D. By this peculiar construction and location of the pipes, which extend only under substantially one-half the length of the kiln, a greater temperature is produced at one end of the kiln, where most desired, for the effectual drying of the lumber or other materials, the portion of the kiln beyond the sections of coils being heated by radiation, where a less degree of temperature is required when the materials to be dried first enter the kiln. The tracks E, upon which the trucks are mounted, are slightly inclined longitudinally, as illustrated in Fig. 1 of the drawings, for the purpose of allowing the trucks when loaded to be easily advanced in the kiln in succession.

Immediately above the drying-chamber is an exhaust-compartment H, the opposite sides of which project, preferably, beyond the vertical sides of the drying-chamber, and a suitable passage-way K leads longitudinally through the floor of the exhaust-compartment, whereby the moisture may pass through from the drying-chamber into the exhaust-compartment. This passage-way may extend the entire length of the ceiling of the drying-chamber or a portion of the length thereof, and hinged in any suitable manner adjacent to the marginal edges of said passage-way are the doors L, which when closed are in substantially perpendicular positions, with the free swinging ends thereof in contact with the ceiling of the exhaust-compartment, and when in such closed relations communication between the drying-chamber and the exhaust-compartment is cut off. It is my purpose to cover the adjacent faces of said doors with an absorbent material P, which will take up the moisture as it passes from the drying-chamber into the exhaust-compartment and by absorbing said moisture will increase the weight of the doors for the purpose of automatically opening the same. These doors under normal conditions, when there is no moisture in the exhaust-chamber, are closed, being counterbalanced and held in closed relations by means of the weights N, which are mounted upon the pivotal arms M on the outer walls of the kiln, said arms being connected by chains Q, which pass over suitable pulleys R to the free swinging edges of the doors, in the manner illustrated in Fig. 5 of the drawings. Said doors are so mounted as to have a minimum amount of friction and are so accurately counterbalanced that the extra weight which is brought to bear upon the doors by the absorption of the moisture passing in contact therewith will cause the doors to turn back by gravity into open positions, thus allowing the draft to be established through the drying-chamber and expediting the drying process. Leading through the top of the exhaust-chamber at locations adjacent to the sides of the compartment are the ventilating-pipes T, provided with rotary cowls at their upper ends. It will be observed that said exhaust-compartment is of sufficient size to allow for the reception of the moisture from the kiln, and by reason of the location of the ventilating-pipes at the sides of the compartment the moisture is drawn from the drying-chamber into the exhaust-compartment more effectually than would be the case if the ventilating-pipes were directly above the passage-way leading from the drying-chamber into the exhaust-compartment.

From the foregoing it will be observed that when the kiln is filled with lumber or other materials to be dried and when the atmosphere within the heating-chamber becomes heavily laden with moisture the doors will be automatically opened by reason of the absorption of moisture by the absorbent coverings of the doors, and the draft through the drying-chamber will be maintained until the moisture is all driven off from the drying-chamber, after which the doors will automatically close, thus shutting off the draft and escape of heat from the drying-chamber, and by reason of the automatic ventilators or pipes through the floor of the exhaust-compartment, dispensing with the tall chimneys commonly used, the ventilation of the exhaust-compartment is regulated, thus giving the operator full control of the hot-air circulation in the kiln.

By the arrangement of the grouping of the steam-pipes a less quantity of coils is utilized than in the ordinary construction of kilns, thereby lessening the distance of the travel of the steam from the supply-head to the exhaust. The space or height of the heating-section is also correspondingly diminished, and the entire length of each connecting-pipe is more uniformly and highly heated, which are important features in effectual dry-kilns.

Having thus described my invention, what I claim to be new, and desire to secure by Letters Patent, is—

1. A drying-kiln, comprising a drying-chamber, an exhaust-compartment, positioned above the drying-chamber, and having a communicating passage-way therewith, hinged and counterbalanced doors, coverings, for said doors, of absorbent material, which are adapted to absorb moisture and cause the doors to open communication between the drying-chamber and the exhaust-compartment, said doors being adapted to close, as the quantity of moisture in the compartment decreases, and evaporates from said covering, as set forth.

2. In a drying-kiln, a drying-chamber, an exhaust-compartment with a communicating passage-way leading to said chamber, hinged and counterbalanced doors, coverings, for said doors, of an absorbent material, adapted to absorb moisture coming from the drying-chamber, and causing the doors to be automatically opened, and automatically-operated ventilators in the roof of said exhaust-compartment, as set forth.

3. A drying-kiln, comprising a drying-chamber, an exhaust-compartment, having a passage-way communicating with the drying-chamber, hinged and counterbalanced doors, coverings of absorbent material on the adjacent faces of said doors, which coverings are adapted to absorb moisture from the drying-chamber, whereby the doors will automatically open, as set forth.

4. In a drying-kiln, a heating-chamber, an exhaust-compartment, a communicating passage-way between same and said drying-chamber, hinged and counterbalanced doors, coverings of absorbent material for said doors, the opposite sides of said exhaust-compartment extending beyond the side walls of the drying-chamber, and automatically-operating ventilators passing through the roof of the exhaust-compartment, adjacent to the opposite sides thereof, as set forth.

5. In a drying-kiln, a drying-chamber, an exhaust-compartment above the drying-chamber and a passage-way communicating therewith, hinged and counterbalanced doors on the opposite edges of said passage-way, the free longitudinal edges of said doors adapted to swing against the ceiling of the exhaust-compartment, to normally close communication between the drying-chamber and the exhaust-compartment, and coverings of absorbent material for the doors, for absorbing moisture, whereby the doors may be automatically opened, and closed as the moisture evaporates from said covering, and automatic ventilators in the roof of the condensing-compartment, as set forth.

6. A drying-kiln, having a drying-chamber, an exhaust-compartment having a communicating passage-way with the drying-chamber, hinged doors on opposite sides of said passage-way, absorbent coverings for the adjacent faces of said doors, pulleys mounted within the exhaust-compartment, pivoted arms on the wall of the drying-chamber, weighted members carried by said arms, and chain connections between the free longitudinal edges of said doors and said pivoted arms, as set forth.

In testimony whereof I hereunto affix my signature in presence of two witnesses.

JOHN J. CURRAN.

Witnesses:
 A. L. HOUGH,
 M. R. TANNER.